(12) United States Patent
Kamen et al.

(10) Patent No.: US 6,915,878 B2
(45) Date of Patent: Jul. 12, 2005

(54) SELF-BALANCING LADDER AND CAMERA DOLLY

(75) Inventors: Dean L. Kamen, Bedford, NH (US); John David Heinzmann, Manchester, NH (US)

(73) Assignee: DEKA Products Limited Partnership, Manchester, NH (US)

(*) Notice: Subject to any disclaimer, the term of this patent is extended or adjusted under 35 U.S.C. 154(b) by 0 days.

(21) Appl. No.: 10/616,025

(22) Filed: Jul. 9, 2003

(65) Prior Publication Data

US 2004/0007425 A1 Jan. 15, 2004

Related U.S. Application Data

(63) Continuation-in-part of application No. 09/325,976, filed on Jun. 4, 1999, which is a continuation-in-part of application No. 08/479,901, filed on Jun. 7, 1995, now Pat. No. 5,975,225, which is a continuation-in-part of application No. 08/384,705, filed on Feb. 3, 1995, now Pat. No. 5,971,091, which is a continuation-in-part of application No. 08/250,693, filed on May 27, 1994, now Pat. No. 5,701,965.

(51) Int. Cl.⁷ .............................................. E04G 1/18
(52) U.S. Cl. ..................... 182/141; 180/6.5; 180/7.1
(58) Field of Search ..................... 182/141; 180/7.1, 180/6.5, 8.2, 21, 65.8, 218, 907; 364/176, 463

(56) References Cited

U.S. PATENT DOCUMENTS

| 584,127 A | 6/1897 | Draullette et al. |
|---|---|---|
| 849,270 A | 4/1907 | Shafer et al. |
| 2,742,973 A | 4/1956 | Johannesen |
| 3,145,797 A | 8/1964 | Taylor |
| 3,260,324 A | 7/1966 | Suarez |
| 3,283,398 A | 11/1966 | Andren |
| 3,288,234 A | 11/1966 | Feliz |
| 3,348,518 A | 10/1967 | Forsyth et al. |
| 3,374,845 A | 3/1968 | Selwyn |
| 3,399,742 A | 9/1968 | Malick |
| 3,446,304 A | 5/1969 | Alimanestiano |
| 3,450,219 A | 6/1969 | Fleming |
| 3,515,401 A | 6/1970 | Gross |
| 3,580,344 A | 5/1971 | Floyd |
| 3,596,298 A | 8/1971 | Durst |

(Continued)

FOREIGN PATENT DOCUMENTS

| DE | 2 048 593 | 5/1971 |
|---|---|---|
| DE | 31 28 112 A1 | 2/1983 |
| DE | 32 42 880 A1 | 6/1983 |

(Continued)

OTHER PUBLICATIONS

Kawaji, S., *Stabilization of Unicycle Using Spinning Motion*, Denki Gakkai Ronbushi, D, vol. 107, Issue 1, Japan (1987), pp. 21–28.

(Continued)

*Primary Examiner*—Bruce A. Lev
(74) *Attorney, Agent, or Firm*—Bromberg & Sunstein LLP

(57) ABSTRACT

A device and methods for supporting a payload, such as a user, at a variable height above the ground and for repositioning the payload in a dynamically stabilized mode of operation. The transporter device has two laterally disposed primary wheels and a payload support that may be used to raise or lower the payload. A torque is applied to the laterally disposed wheels so as to propel the transporter on the basis of a control signal that may include repositioning of the device.

8 Claims, 9 Drawing Sheets

U.S. PATENT DOCUMENTS

| | | | |
|---|---|---|---|
| 3,860,264 A | 1/1975 | Douglas et al. | |
| 3,872,945 A | 3/1975 | Hickman et al. | |
| 3,952,822 A | 4/1976 | Udden et al. | |
| 4,018,440 A | 4/1977 | Deutsch | |
| 4,062,558 A | 12/1977 | Wasserman | |
| 4,076,270 A | 2/1978 | Winchell | |
| 4,088,199 A | 5/1978 | Trautwein | |
| 4,094,372 A | 6/1978 | Notter | |
| 4,109,741 A | 8/1978 | Gabriel | |
| 4,111,445 A | 9/1978 | Haibeck | |
| 4,151,892 A | 5/1979 | Francken | |
| 4,174,021 A | * 11/1979 | Barlock | 182/17 |
| 4,222,449 A | 9/1980 | Feliz | |
| 4,264,082 A | 4/1981 | Fouchey, Jr. | |
| 4,266,627 A | 5/1981 | Lauber | |
| 4,293,052 A | 10/1981 | Daswick et al. | |
| 4,325,565 A | 4/1982 | Winchell | |
| 4,354,569 A | 10/1982 | Eichholz | |
| 4,363,493 A | 12/1982 | Veneklasen | |
| 4,373,600 A | 2/1983 | Buschbom et al. | |
| 4,375,840 A | 3/1983 | Campbell | |
| 4,510,956 A | 4/1985 | King | |
| 4,560,022 A | 12/1985 | Kassai | |
| 4,566,707 A | 1/1986 | Nitzberg | |
| 4,570,078 A | 2/1986 | Yashima et al. | |
| 4,571,844 A | 2/1986 | Komasaku et al. | |
| 4,624,469 A | 11/1986 | Bourne, Jr. | |
| 4,657,272 A | 4/1987 | Davenport | |
| 4,685,693 A | 8/1987 | Vadjunec | |
| 4,709,772 A | 12/1987 | Brunet | |
| 4,716,980 A | 1/1988 | Butler | |
| 4,740,001 A | 4/1988 | Torleumke | |
| 4,746,132 A | 5/1988 | Eagan | |
| 4,770,410 A | 9/1988 | Brown | |
| 4,786,069 A | 11/1988 | Tang | |
| 4,790,400 A | 12/1988 | Sheeter | |
| 4,790,548 A | 12/1988 | Decelles et al. | |
| 4,794,999 A | 1/1989 | Hester | |
| 4,796,537 A | * 1/1989 | Besser | 104/37 |
| 4,798,255 A | 1/1989 | Wu | |
| 4,802,542 A | 2/1989 | Houston et al. | |
| 4,809,804 A | 3/1989 | Houston et al. | |
| 4,834,200 A | 5/1989 | Kajita | |
| 4,863,182 A | 9/1989 | Chern | |
| 4,867,188 A | 9/1989 | Reid | |
| 4,869,279 A | 9/1989 | Hedges | |
| 4,874,055 A | 10/1989 | Beer | |
| 4,890,853 A | 1/1990 | Olson | |
| 4,919,225 A | 4/1990 | Sturges | |
| 4,953,851 A | 9/1990 | Sherlock et al. | |
| 4,984,754 A | 1/1991 | Yarrington | |
| 4,985,947 A | 1/1991 | Ethridge | |
| 4,998,596 A | 3/1991 | Miksitz | |
| 5,002,295 A | 3/1991 | Lin | |
| 5,011,171 A | 4/1991 | Cook | |
| 5,052,237 A | 10/1991 | Reimann | |
| 5,111,899 A | 5/1992 | Reimann | |
| 5,158,493 A | 10/1992 | Morgrey | |
| 5,161,820 A | 11/1992 | Vollmer | |
| 5,168,947 A | 12/1992 | Rodenborn | |
| 5,171,173 A | 12/1992 | Henderson et al. | |
| 5,186,270 A | 2/1993 | West | |
| 5,221,883 A | 6/1993 | Takenaka et al. | |
| 5,241,875 A | 9/1993 | Kochanneck | |
| 5,248,007 A | 9/1993 | Watkins et al. | |
| 5,314,034 A | 5/1994 | Chittal | |
| 5,350,033 A | 9/1994 | Kraft | |
| 5,366,036 A | 11/1994 | Perry | |
| 5,376,868 A | 12/1994 | Toyoda et al. | |
| 5,419,624 A | 5/1995 | Adler et al. | |
| 5,701,965 A | 12/1997 | Kamen et al. | |
| 5,701,968 A | 12/1997 | Wright-Ott et al. | |
| 5,775,452 A | 7/1998 | Patmont | |
| 5,791,425 A | 8/1998 | Kamen et al. | |
| 5,794,730 A | 8/1998 | Kamen | |
| 5,971,091 A | 10/1999 | Kamen et al. | |
| 5,973,463 A | 10/1999 | Okuda et al. | |
| 5,975,225 A | 11/1999 | Kamen et al. | |
| 5,986,221 A | 11/1999 | Stanley | |
| 6,003,624 A | 12/1999 | Jorgensen et al. | |
| 6,039,142 A | 3/2000 | Eckstein et al. | |
| 6,050,357 A | 4/2000 | Staelin et al. | |
| 6,059,062 A | 5/2000 | Staelin et al. | |
| 6,125,957 A | 10/2000 | Kauffmann | |
| 6,131,057 A | 10/2000 | Tamaki et al. | |
| 6,223,104 B1 | 4/2001 | Kamen et al. | |
| 6,225,977 B1 | 5/2001 | Li | |
| 6,288,505 B1 | 9/2001 | Heinzmann et al. | |
| 6,302,230 B1 | 10/2001 | Kamen et al. | |
| 6,311,794 B1 | * 11/2001 | Morrell et al. | 180/8.3 |
| 6,325,168 B1 | * 12/2001 | Hillel | 180/14.1 |
| 6,405,831 B1 | * 6/2002 | Daniel, III | 182/127 |
| 6,571,892 B2 | * 6/2003 | Kamen et al. | 180/8.2 |
| 6,695,287 B1 | * 2/2004 | De Boer | 254/10 C |
| 2001/0047905 A1 | * 12/2001 | Boyer | 182/15 |
| 2002/0023787 A1 | * 2/2002 | Kamen et al. | 180/7.1 |
| 2002/0063006 A1 | 5/2002 | Kamen et al. | |
| 2002/0170754 A1 | * 11/2002 | Heinzmann | 180/7.1 |
| 2003/0178814 A1 | * 9/2003 | Goldie | 280/641 |
| 2004/0055795 A1 | * 3/2004 | Kamen et al. | 180/7.1 |

FOREIGN PATENT DOCUMENTS

| | | |
|---|---|---|
| DE | 3411489 A1 | 10/1984 |
| DE | 44 04 594 A 1 | 8/1995 |
| DE | 196 25 498 C 1 | 11/1997 |
| DE | 298 08 091 U1 | 10/1998 |
| DE | 298 08 096 U1 | 10/1998 |
| EP | 0 109 927 | 7/1984 |
| EP | 0 193 473 | 9/1986 |
| EP | 0 537 698 A1 | 4/1993 |
| EP | 0663 313 A1 | 7/1995 |
| EP | 0 958 978 A2 | 11/1999 |
| FR | 980 237 | 5/1951 |
| FR | 82 04314 | 9/1982 |
| GB | 152664 | 2/1922 |
| GB | 1213930 | 11/1970 |
| GB | 2 139 576 A | 11/1984 |
| JP | 52-44933 | 10/1975 |
| JP | 57-87766 | 6/1982 |
| JP | 57-110569 | 7/1982 |
| JP | 59-73372 | 4/1984 |
| JP | 62-12810 | 7/1985 |
| JP | 0255580 | 12/1985 |
| JP | 61-31685 | 2/1986 |
| JP | 63-305082 | 12/1988 |
| JP | 2-190277 | 7/1990 |
| JP | 4-201793 | 7/1992 |
| JP | 6-171562 | 12/1992 |
| JP | 5-213240 | 8/1993 |
| JP | 6-105415 | 12/1994 |
| JP | 7255780 | 3/1995 |
| WO | WO 86/05752 | 10/1986 |
| WO | WO 89/06117 | 7/1989 |
| WO | WO 96/23478 | 8/1996 |
| WO | WO 98/46474 | 10/1998 |
| WO | WO 00 75001 A | 12/2000 |

OTHER PUBLICATIONS

Schoonwinkel, A., *Design and Test of a Computer–Stabilized Unicycle*, Stanford University (1988), UMI Dissertation Services.

Vos, D., *Dynamics and Nonlinear Adaptive Control of an Autonomous Unicycle*, Massachusetts Institute of Technology, 1989.

Vos, D., *Nonlinear Control of an Autonomous Unicycle Robot: Practical Isues*, Massachusetts Institute of Technology, 1992.

Koyanagi et al., *A Wheeled Inverse Pendulum Type Self-Contained Mobile Robot and its Posture Control and Vehicle Control, The Society of Instrument and Control Engineers*, Special issue of the $31^{st}$ SICE Annual Conference, Japan 1992, pp. 13–16.

Koyanagi et al., *A Wheeled Inverse Pendulum Type Self-Contained Mobile Robot, The Society of Instrument and Control Engineers*, Special issue of the $31^{st}$ SICE Annual Conference, Japan 1992, pp. 51–56.

Koyanagi et al., *A Wheeled Inverse Pendulum Type Self-Contained Mobile Robot and its Two Dimensional Trajectory Control, Proceeding of the Second International Symposium on Measurement and Control in Robotics*, Japan 1992, pp. 891–898.

Watson Industries, Inc., Vertical Reference Manual ADS–C132–1A, 1992, pp. 3–4.

News article *Amazing Wheelchair Goes Up and Down Stairs*.

Osaka et al., *Stabilization of unicycle, Systems and Control*, vol. 25, No. 3, Japan 1981, pp. 159–166 (Abstract Only).

Roy et al., *Five–Wheel Unicycle System, Medical & Biological Engineering & Computing*, vol. 23, No. 6, United Kingdom 1985, pp. 593–596.

Kawaji, S., *Stabilization of Unicycle Using Spinning Motion, Denki Gakkai Ronbushi, D*, vol. 107, Issue 1, Japan 1987, pp. 21–28 (Absract Only).

Schoonwinkel, A., *Design and Test of a Computer–Stabilized Unicycle, Dissertation Abstracts International*, vol. 49/30–B, Stanford University 1988, pp. 890–1294 (Abstract Only).

Vos et al., *Dynamics and Nonlinear Adaptive Control of an Autonomous Unicycle—Theory and Experiment, American Institute of Aeronautics and Astronautics*, A90–26772 10–39, Washington, D.C. 1990, pp. 487–494 (Abstract only).

Tecknico's Home Page, *Those Amazing Flying Machines*, http://www.swiftsite.com/technico.

*Stew's Hovercraft Page*, http://www.stewcam.com/hovercraft.html.

Kanoh, *Adaptive Control of Inverted Pendulum, Computrol*, vol. 2, (1983), pp. 69–75.

Yamafuji, *A Proposal for Modular–Structured Mobile Robots for Work that Principally Involve a Vehicle with Two Parallel Wheels, Automation Technology*, vol. 20, pp. 113–118 (1988).

Yamafuji & Kawamura, *Study of Postural and Driving Control of Coaxial Bicycle, Paper Read at Meeting of Japan Society of Mechanical Engineering (Series C)*, vol. 54, No. 501, (May, 1988), pp. 1114–1121.

Yamafuji et al., *Synchronous Steering Control of a Parallel Bicycle, Paper Read at Meeting of Japan Society of Mechanical Engineering (Series C)*, vol. 55, No. 513, (May, 1989), pp. 1229–1234.

Momoi & Yamafuji, *Motion Control of the Parallel Bicycle–Type Mobile Robot Composed of a Triple Inverted Pendulum, Paper Read at Meeting of Japan Society of Mechanical Engineering (Series C)*, vol. 57, No. 541, (Sep., 1991), pp. 154–159.

Aucoin, *Olin Students Find Balance in Segway Project*, Boston Globe, Apr. 5, 2003, p. D1.

\* cited by examiner

SELF-BALANCING LADDER AND CAMERA DOLLY

CROSS REFERENCE TO RELATED APPLICATIONS

The present application is a continuation-in-part application of copending U.S. application Ser. No. 09/325,976, filed Jun. 4, 1999, which is a continuation-in-part (CIP) of U.S. application Ser. No. 08/479,901, filed Jun. 7, 1995, and issued Nov. 2, 1999 as U.S. Pat. No. 5,975,225, which was a CIP of U.S. application Ser. No. 08/384,705, filed Feb. 3, 1995, and issued Oct. 26, 1999 as U.S. Pat. No. 5,971,091, which was a CIP of U.S. application Ser. No. 08/250,693, filed May 27, 1994, and issued Dec. 24, 1997 as U.S. Pat. No. 5,701,965, from which the present application claims priority, all of which applications and patents are incorporated herein by reference.

TECHNICAL FIELD

The present invention pertains to modes for actively balanced operation of an elevated support for a user or equipment.

BACKGROUND ART

"Stability" as used in this description and in any appended claims refers to the mechanical condition of an operating position or attitude of a mechanical system with respect to which the system will naturally return if the system is perturbed away from the operating position or attitude in any respect.

The term "dynamically stabilized transporter" refers, in this application, to a device for personal locomotion or support of a person or equipment in a fixed position, which device has a control system that is capable of actively maintaining the stability of the transporter during operation of the transporter. The control system maintains stability of the transporter by continuously sensing the orientation, and/or changes in the orientation, of the transporter, determining the corrective action to maintain stability, and commanding the wheel motors to make the corrective action. Such a transporter is described, for example, in U.S. Pat. No. 5,971,091 (Kamen et al., issued Oct. 26, 1999), which is incorporated herein by reference.

A wide range of vehicles and methods are known for supporting or transporting human subjects. Typically, such vehicles or supports rely upon static stability, being designed so as to be stable under all foreseen conditions of placement of their ground-contacting members. Thus, for example, the gravity vector acting on the center of gravity of an automobile passes between the points of ground contact of the automobile's wheels, the suspension keeping all wheels on the ground at all times, and the automobile is thus stable. Another example of a statically stable vehicle is the stair-climbing vehicle described in U.S. Pat. No. 4,790,548 (Decelles et al.).

SUMMARY OF THE INVENTION

In accordance with preferred embodiments of the present invention there is provided a device for carrying a payload, which may include a user, over a surface. The device has a payload support which supports the payload at a height above the surface, and a ground-contacting module, mounted to the platform, that includes a plurality of laterally disposed ground-contacting members. The ground-contacting module defines a fore-aft plane by virtue of its direction of motion. The device also has a motorized drive arrangement, coupled to the ground-contacting module. Together, the drive arrangement, ground-contacting module and payload constitute a system, and the motorized drive arrangement causes, when powered, automatically balanced operation of the system in an operating position that is unstable with respect to tipping in at least a fore-aft plane when the motorized drive arrangement is not powered. Finally, the device may have an elevation mechanism for permitting variation of the height of the payload above the surface.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1D:
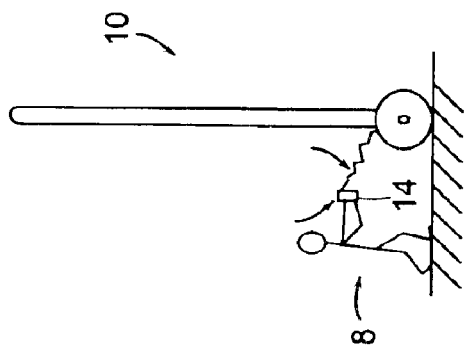
FIG. 1A is a front view and FIGS. 1A–1D are side views of one embodiment of a human transporter allowing a user to change elevation with respect to the ground while being supported on a balancing device.
Figure 1C:
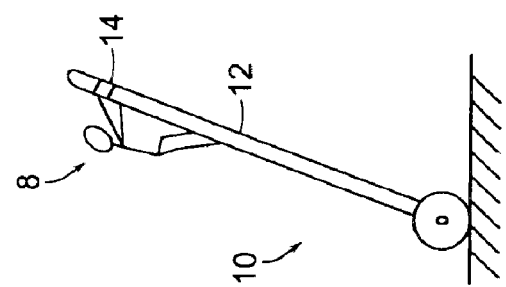
Figure 1B:
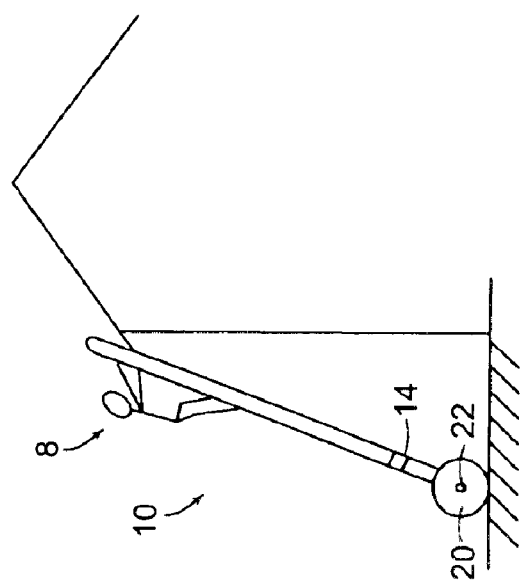
Figure 1A:
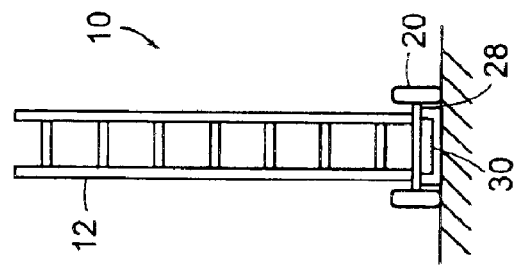

A simplified embodiment of the invention is first discussed with reference to the various views depicted in FIGS. 1A–1F. FIG. 1A depicts a front view of a personal transporter, designated generally by numeral 10, bearing a user support 12, here shown as a ladder. A user (or 'subject') 8 may stand, or be otherwise supported, on user support 12 or on a supporting member. While, in the embodiment depicted in FIG. 1A, user support 12 is a ladder, it may also be a platform, step, seat, bucket, or other structure. To the extent to which the height of the user support may be varied either through active adjustment or with mechanical assistance, such adjustment provision is referred to herein, and in any appended claims, as an 'elevation mechanism.'

A controller 14 provides user input to a control loop, including motorized-drive 28, and tilt sensor module 30, provided so that leaning of the transporter device results, during a lean-controlled mode of operation, in the application of torque by motorized-drive 28 to a ground-contacting member (in this case, wheel 20) about axle 22 thereby causing an acceleration of the transporter. Transporter 10 (otherwise referred to, herein, as a 'vehicle'), is statically unstable, and, absent operation of the control loop to maintain dynamic stability, other measures must be taken, such as those discussed below, to provide stable support for the payload.

Different numbers of wheels or other ground-contacting members may advantageously be used in various embodiments of the invention as particularly suited to varying applications. Thus, as described in greater detail below, the number of ground-contacting members may be any number equal to, or greater than, one. Transporter 10, by virtue of its overall small projection onto the underlying surface, may advantageously be used as a mobile work platform.

A characteristic of many transporter embodiments to which the present invention may be applied is the use of a pair of laterally disposed ground-contacting members 20 to support a subject over a surface with respect to which the subject is being transported. The ground or other surface, such as a floor, over which a vehicle in accordance with the invention is employed may be referred to generally herein as the "ground." The ground-contacting members 20, here depicted as wheels, are motor-driven. In many embodiments, the configuration in which the subject is supported during locomotion lacks inherent stability in the fore-aft plane at least a portion of the time with respect to a vertical (axis z) but is relatively stable with respect to a vertical in the lateral plane.

Some embodiments of the invention may invoke the concept of primary wheels. The term "primary wheels," as used in this description and in any appended claims, refers to a minimum set of a vehicle's wheels on which the vehicle is capable of operating stably. More generally, the term "primary ground-contacting members" allows for a more general class of members, that includes but is not limited to wheels. Hence, as used in this description and in any appended claims, "primary ground-contacting members" refers to a minimum set of a vehicle's ground-contacting members on which the vehicle is capable of operating stably. Other ground-contacting members may include, without limitation: arcuate sections of a wheel, clusters of wheels, treads, etc.

In various embodiments of the invention, fore-aft stability may be achieved by providing a control loop, in which one or more motors are included, for operation of a motorized drive in connection with the ground-contacting members. As described below, a pair of ground-contacting members may, for example, be a pair of wheels or a pair of wheel clusters. In the case of wheel clusters, each cluster may include a plurality of wheels. Each ground-contacting member, however, may instead be a plurality (typically a pair) of axially-adjacent, radially supported and rotatably mounted arcuate elements. In these embodiments, the ground-contacting members are driven by the motorized drive in the control loop in such a way as to maintain, when the vehicle is not in locomotion, the center of mass of the vehicle above the region of contact of the ground-contacting members with the ground, regardless of disturbances and forces operative on the vehicle.

Also, as described above, in addition to control of the vehicle by leaning, user input may be separately incorporated into the control loop in a manner equivalent to variation of one or more of the input variables. Thus, for example, the user may provide an input, by means of a user interface of any sort, the input being treated by the control system equivalently to a change, for example, in vehicle orientation or tilt. Such an interface may include, for example, a thumbwheel or a joystick mounted on a user input interface 14, which, in the embodiment depicted, may travel along a rail as the user ascends or descends support 12. In other embodiments of the invention, user input interface 14 may be detached from the transporter and carried by the user, and may communicate with the control system of the transporter either by wire or wirelessly.

Transporter 10 may be operated in a station-keeping mode, where balance is maintained substantially at a specified position. Additionally, transporter 10 may also be capable of maintaining a fixed position and orientation without active balancing, under specified conditions, when the user 8 is either on, or off, user support 12. This mode of operation prevents runaway of the vehicle and provides for the safety of the user and other persons, such as when the user has ascended support 12 to conduct some activity at an elevated position above the ground. In certain embodiments, once the ladder, or other support, is in a desired position, as leaning against a house or other structure, as shown in FIG. 1B, for example, wheels 20 may be locked and any balancing function is disabled. User 8 may resume the balancing function and continue driving and steering transporter 10 from atop support 12 by use of user interface 14, as depicted in FIG. 1C. Referring to FIG. 1D, user 8 may control balancing transporter 10 via user input device 14 tethered, or wirelessly coupled, to the transporter, and drive the transporter to a desired location.

Figure 1E:
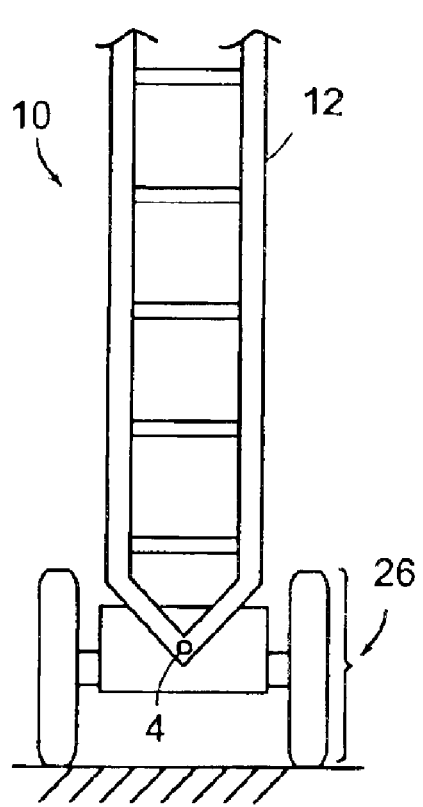
FIGS. 1E and 1F are rear views of a ladder-bearing human transporter device that provides for lateral pivoting of a user support with respect to a transporter base in accordance with an embodiment of the present invention.
Figure 1F:
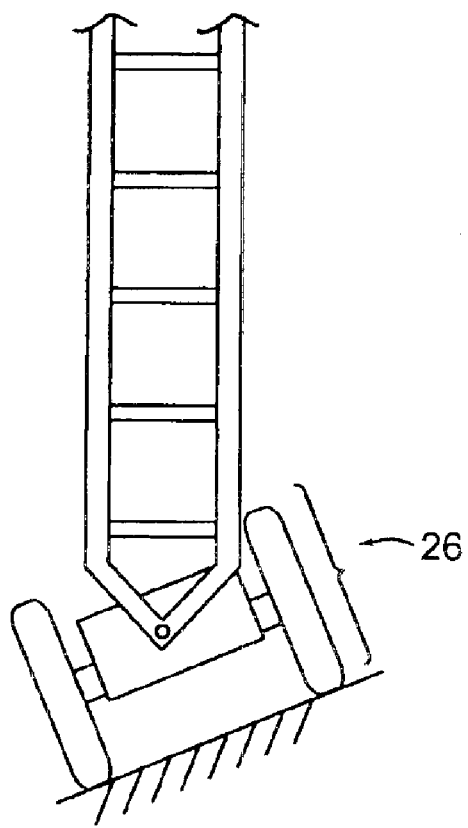

Lateral stability may be provided, in accordance with certain embodiments of the invention, as depicted in FIGS. 1E and 1F. A pivot 4 parallel to the direction of motion of transporter 10 allows support 12 to pivot with respect to transporter ground-contacting module 26. A motor (not shown) coupled between the ladder and the ground-contacting module allows torque to be applied to the base of the ladder to keep it vertical in the face of ground irregularities, as shown in FIG. 1F. Torque is applied to maintain ladder verticality in the same manner as controller 24 maintains fore/aft stability in the face of transporter tilt.

Figure 2:
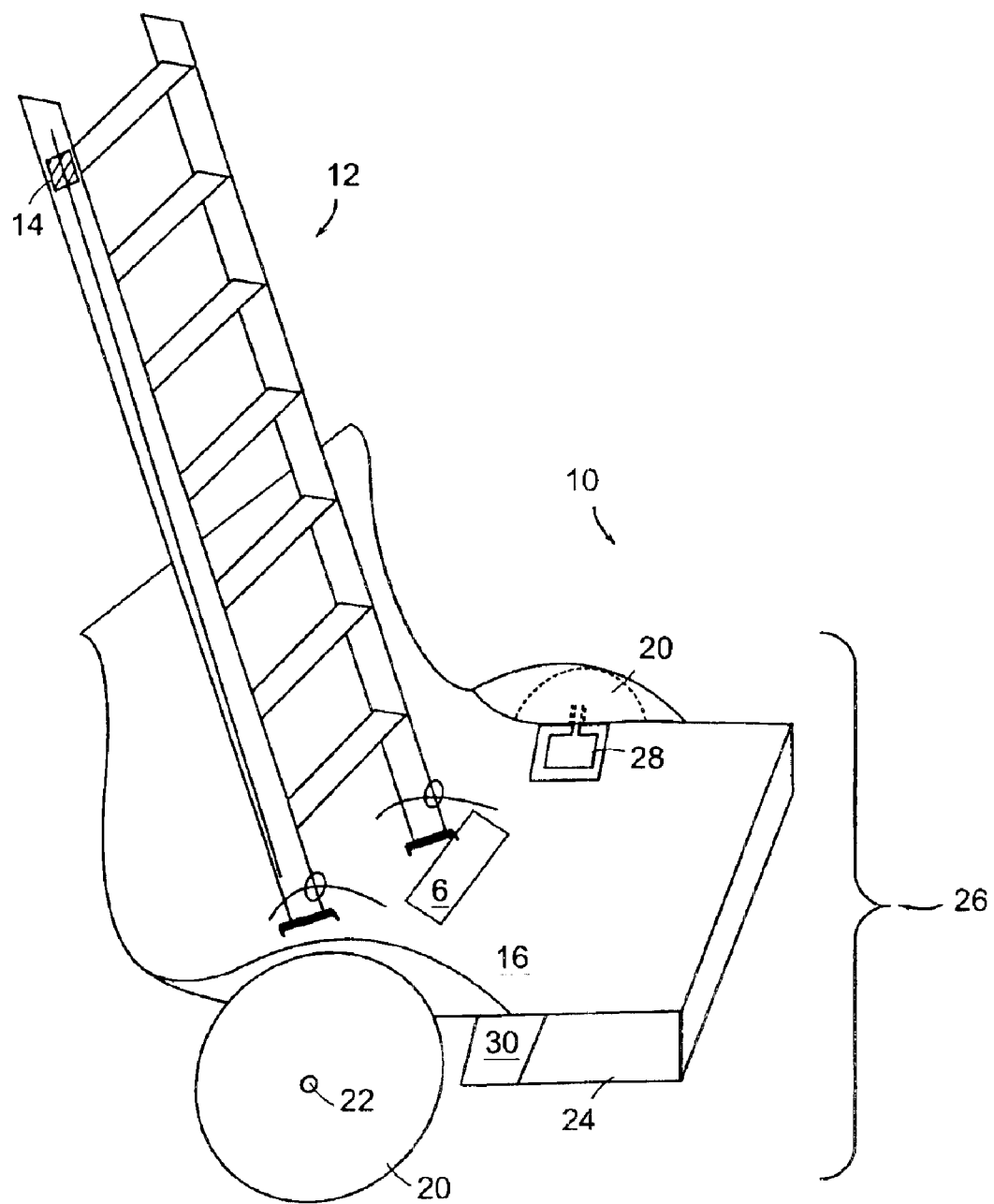
FIG. 2 depicts a further embodiment of a human transporter in which a user may change elevation with respect to the ground while being supported on a balancing device.

Referring now to an embodiment of the invention depicted in FIG. 2, the user may also stand on platform (or 'base') 16 of ground-contacting module 26. Wheels 20 are shown as coaxial about the Y axis. Any user input device that provides the functions discussed below is within the scope of the present invention.

A forceplate 6 or other sensor, disposed on user support 12, detects the presence and, in some embodiments, also the position, of a user on the device. Alternatively, or in addition, one or more sensors may be disposed on user support 12 in order to detect the presence or position of the user.

In addition to primary ground-contacting elements 20, a stationary ground-contacting element, such as a retractable foot (not shown), may be provided for static stability when it is desirable to lock transporter 10 in a stationary position with the dynamic stabilization mechanism disabled. A retractable foot may be lowered by an actuator mechanism, typically a hydraulic piston or screw drive actuator, when the user wishes to provide static stability at a specified location.

One or more actuators 36 (shown in FIG. 7), typically driven either hydraulically or by a screw drive, may be employed to extend the height of support 12.

Figure 3:
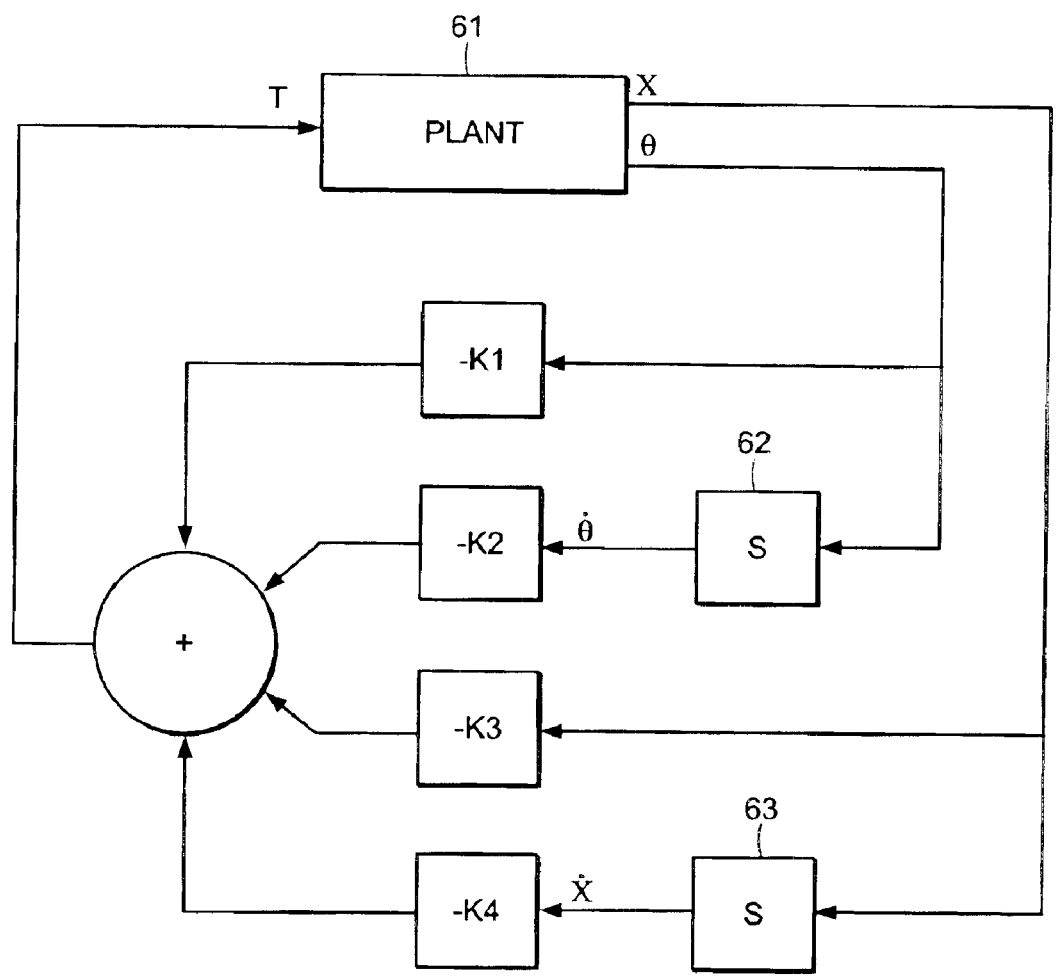
FIG. 3 is a basic block diagram of a controller of a transporter, in accordance with embodiments of the invention.

A simplified control algorithm for achieving balance in the embodiment of the invention according to FIG. 1 when the wheels are active for locomotion is shown in the block diagram of FIG. 3. The plant 61 is equivalent to the equations of motion of a system with a ground contacting module driven by a single motor, before the control loop is applied. T identifies the wheel torque. The remaining portion of the figure is the control used to achieve balance. The boxes 62 and 63 indicate differentiation. To achieve dynamic control to insure stability of the system, and to keep the system in the neighborhood of a reference point on the surface, the wheel torque T in this embodiment is governed by the following simplified control equation:

$$T = K_1(\theta - \theta_0) + K_2(\dot{\theta} - \dot{\theta}_0) + K_3(x - x_0) + K_4(\dot{x} - \dot{x}_0), \quad \text{(Eqn. 1)}$$

where:

T denotes a torque applied to a ground-contacting element about its axis of rotation;

$\theta$ is a quantity corresponding to the lean of the entire system about the ground contact, with $\theta_0$ representing the magnitude of a system pitch offset, all as discussed in detail below;

x identifies the fore-aft displacement along the surface relative to a fiducial reference point, with $x_0$ representing the magnitude of a specified fiducial reference offset;

a dot over a character denotes a variable differentiated with respect to time; and a variable subscripted with a '0' denotes a specified offset that may be input into the system as described below; and $K_1$, $K_2$, $K_3$, and $K_4$ are gain coefficients that may be configured, either in design of the system or in real-time, on the basis of a current operating mode and operating conditions as well as preferences of a user. The gain coefficients may be of a positive, negative, or zero magnitude, affecting thereby the mode of operation of the vehicle, as discussed below. The gains $K_1$, $K_2$, $K_3$, and $K_4$ are dependent upon the physical parameters of the system and other effects such as gravity. The simplified control algorithm of FIG. 3 maintains balance and also proximity to the reference point on the surface in the presence of disturbances such as changes to the system's center of mass with respect to the reference point on the surface due to body motion of the subject or contact with other persons or objects. It should be noted that the amplifier control may be configured to control motor current (in which case torque T is commanded, as shown in FIG. 3) or, alternatively, the voltage applied to the motor may be controlled, in which case the commanded parameter is, to a close approximation, in the case of low-resistance motors, velocity. The motor speed may also be controlled.

The effect of $\theta_0$ in the above control equation (Eqn. 1) is to produce a specified offset $\theta_0$ from the non-pitched position where $\theta = 0$. As discussed in further detail below, in various embodiments, pitch offset may be adjusted by the user, for example, by means of user input interface 14, shown in FIG. 1. Alternatively, $\theta_0$ can be set by the control system of the vehicle as a method of limiting the speed and/or the performance of the vehicle.

In other embodiments of the invention, a balancing ladder may be driven solely under joystick control.

The magnitude of $K_3$ determines the extent to which the vehicle will seek to return to a given location. With a non-zero $K_3$, the effect of $x_0$ is to produce a specified offset—$x_0$ from the fiducial reference by which x is measured. When $K_3$ is zero, the vehicle has no bias to return to a given location. The consequence of this is that if the vehicle is caused to lean in a forward direction, the wheels will move in a forward direction, thereby maintaining balance.

The term "lean", as used herein, refers to a quantity that expresses the orientation with respect to the vertical (i.e., an imaginary line passing through the center of the earth) of a line from the center of gravity (CG) of the system through the theoretical line characterizing the ground contact of the wheels (even if the actual ground contact is a region of small area). The term "system" refers, unless the context requires otherwise, to all mass caused to move due to motion of the ground-contacting elements with respect to the surface over which the vehicle is moving.

Figure 4:
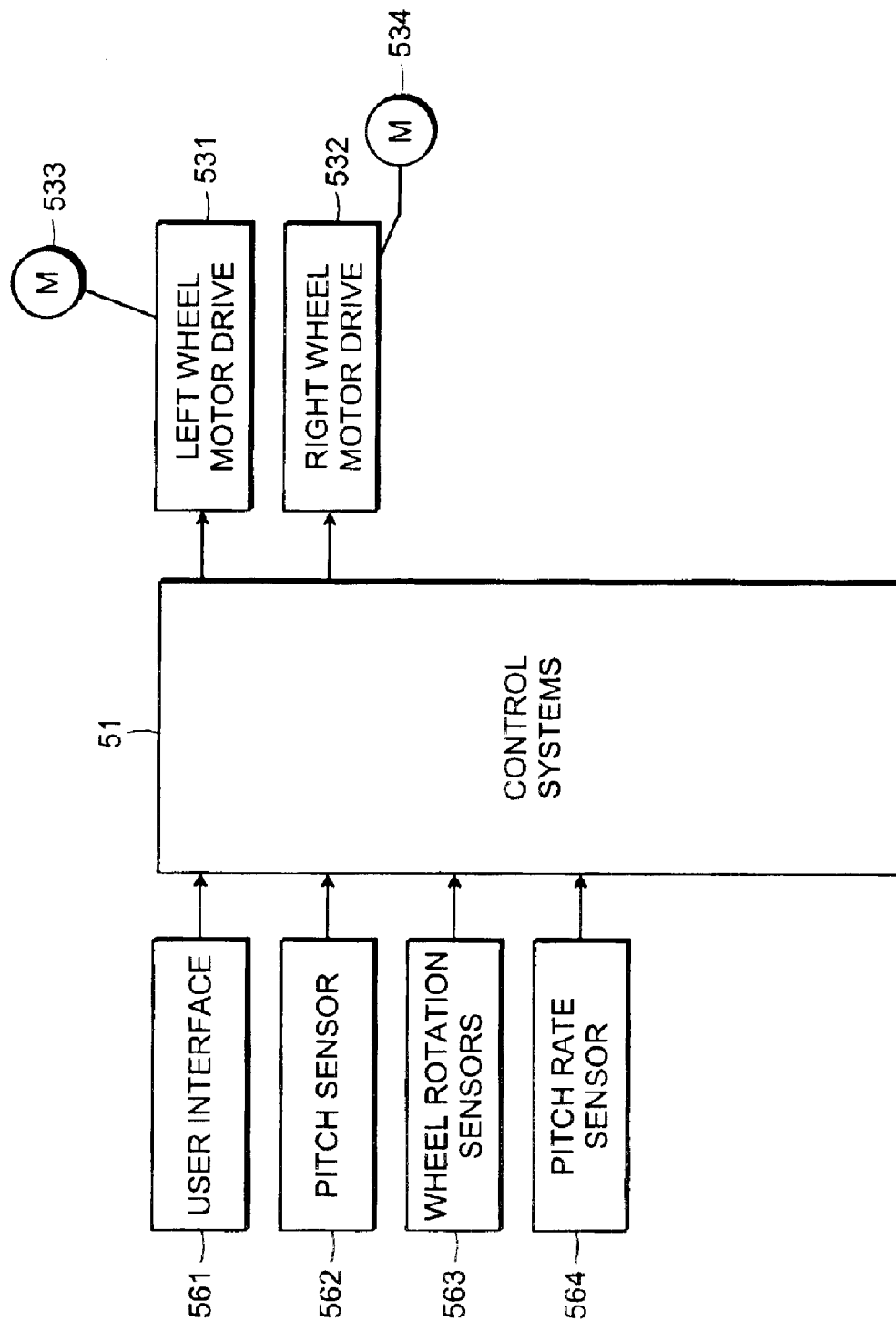
FIG. 4 is a block diagram showing generally the nature of sensors, power and control with the embodiment of FIG. 1.

In order to accommodate two wheels instead of the one-wheel system illustrated for simplicity in FIG. 3, separate motors may be provided for left and right wheels of the vehicle and the torque desired from the left motor and the torque to be applied by the right motor can be governed as shown in FIG. 4. In the block diagram of FIG. 4 it can be seen that a control system 51 is used to control the motor drives and actuators of the embodiment of FIG. 1 to achieve locomotion and balance. These include motor drives 531 and 532 for left and right wheels respectively. If clusters of wheels are present, as in the embodiment of FIG. 6, actuators are provided for left and right clusters respectively. The control system has data inputs including user interface 561, pitch sensor 562 for sensing fore-aft pitch, and wheel rotation sensors 563, and pitch rate sensor 564. Pitch rate and pitch may be derived through the use of gyroscopes or inclinometers, for example, alone or in combination. Additionally, tracking both the left wheel motion and the right wheel motion permits adjustments to be made to prevent unwanted turning of the vehicle and to account for performance variations between the two drive motors.

Operating modes of the transporter may include modes wherein the rider is supported by the transporter but may also include modes where the rider is not supported by the transporter. For example, it may be advantageous for the rider to be able to 'drive' or to 'conduct' the transporter while walking alongside or behind it.

Figure 5:
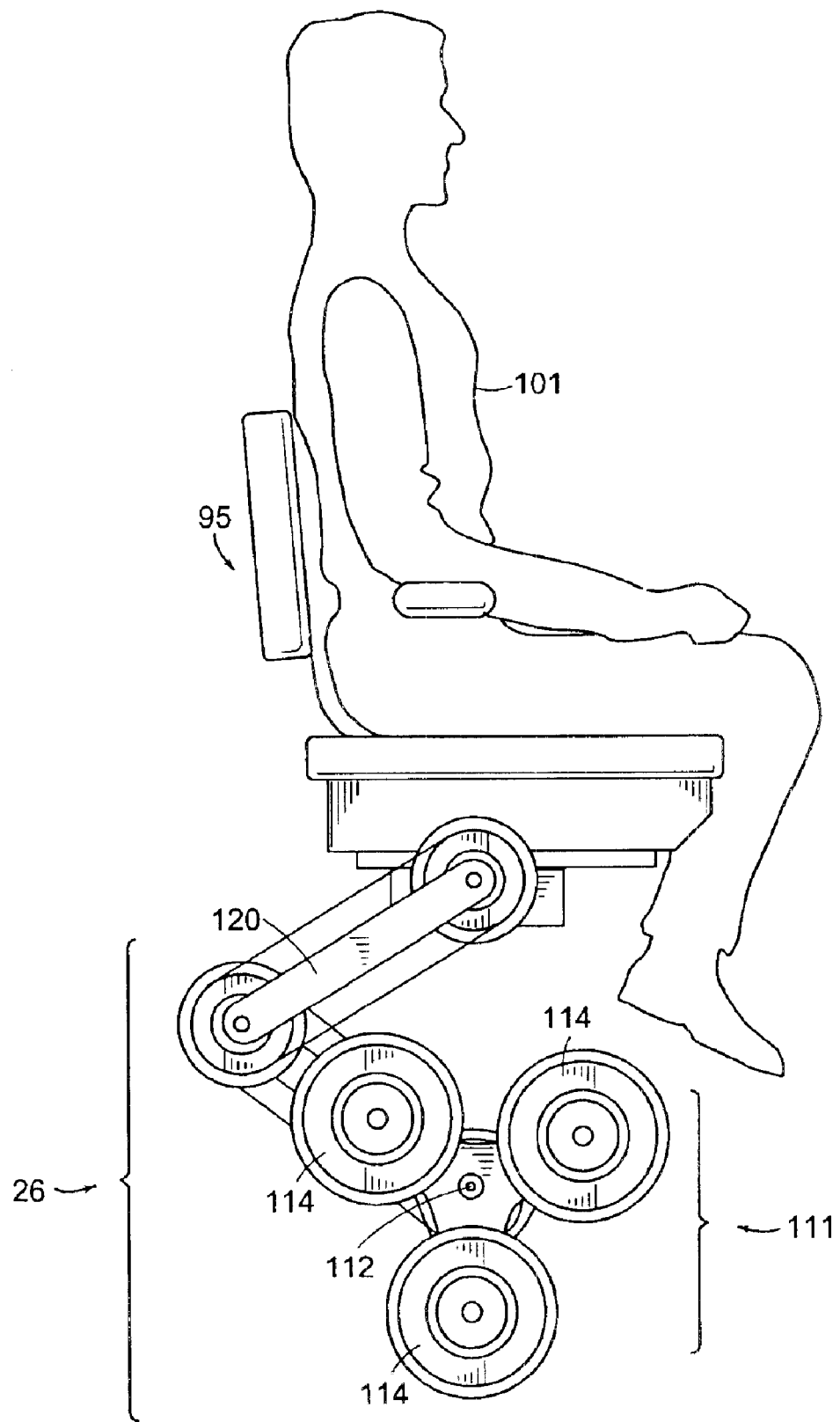
FIG. 5 is a side view of a balancing transporter employing an alternate means for adjusting the elevation above the ground of a seated user, in accordance with another embodiment of the invention.

FIG. 5 shows use of a three-wheel cluster design in various modes and configurations. Each three-wheel cluster (right-hand cluster 111 is shown here) is rotatably mounted and motor-driven about axis 112, using separately controllable motors. The wheels 114 of each cluster are separately driven and controlled, but run synchronously in each cluster. Link 120, coupling support 25 to ground-contacting module 26, allows for variation of the elevation above the ground of user 101.

Figure 6:
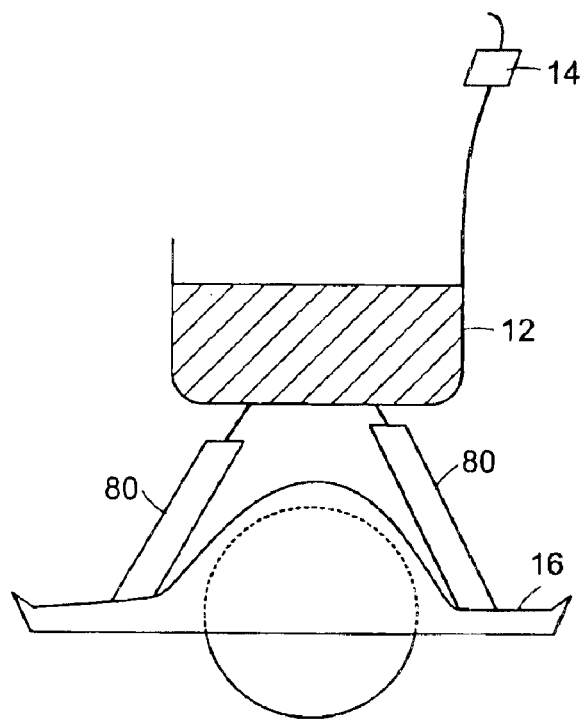
FIG. 6 is a side view of a balancing transporter employing hydraulic pistons for adjusting the elevation above the ground of a user, in accordance with another embodiment of the invention.
Figure 7:
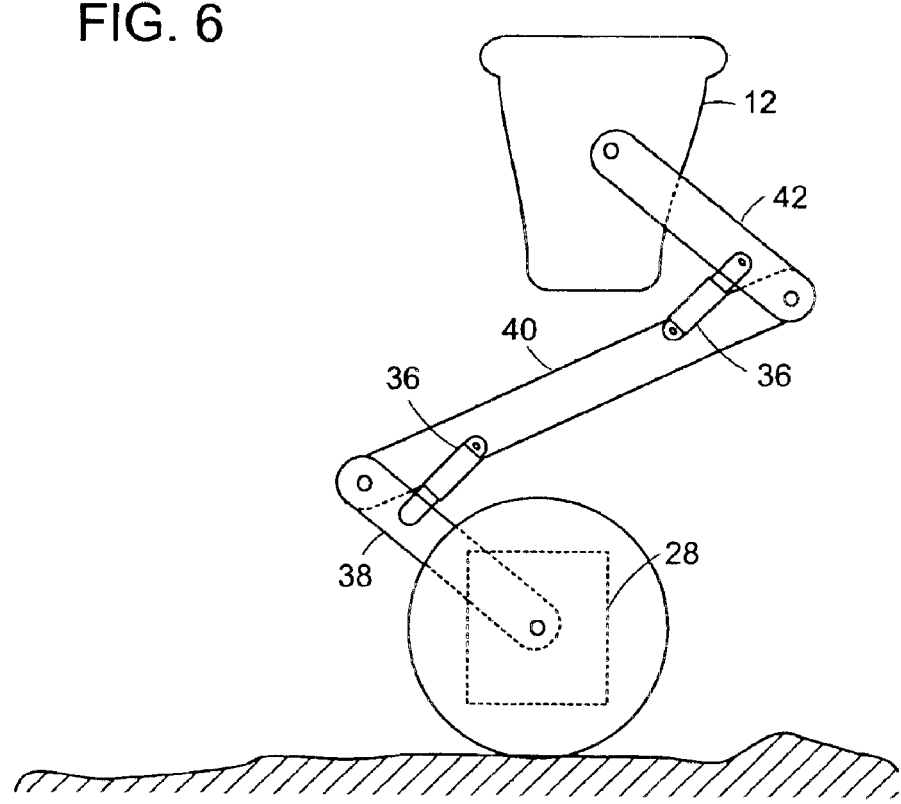
FIG. 7 is a side view of a balancing transporter configured as a "cherry picker" in which an articulated mechanism is employed for adjusting the elevation above the ground of a user borne in a bucket, in accordance with another embodiment of the invention.
Figure 8:
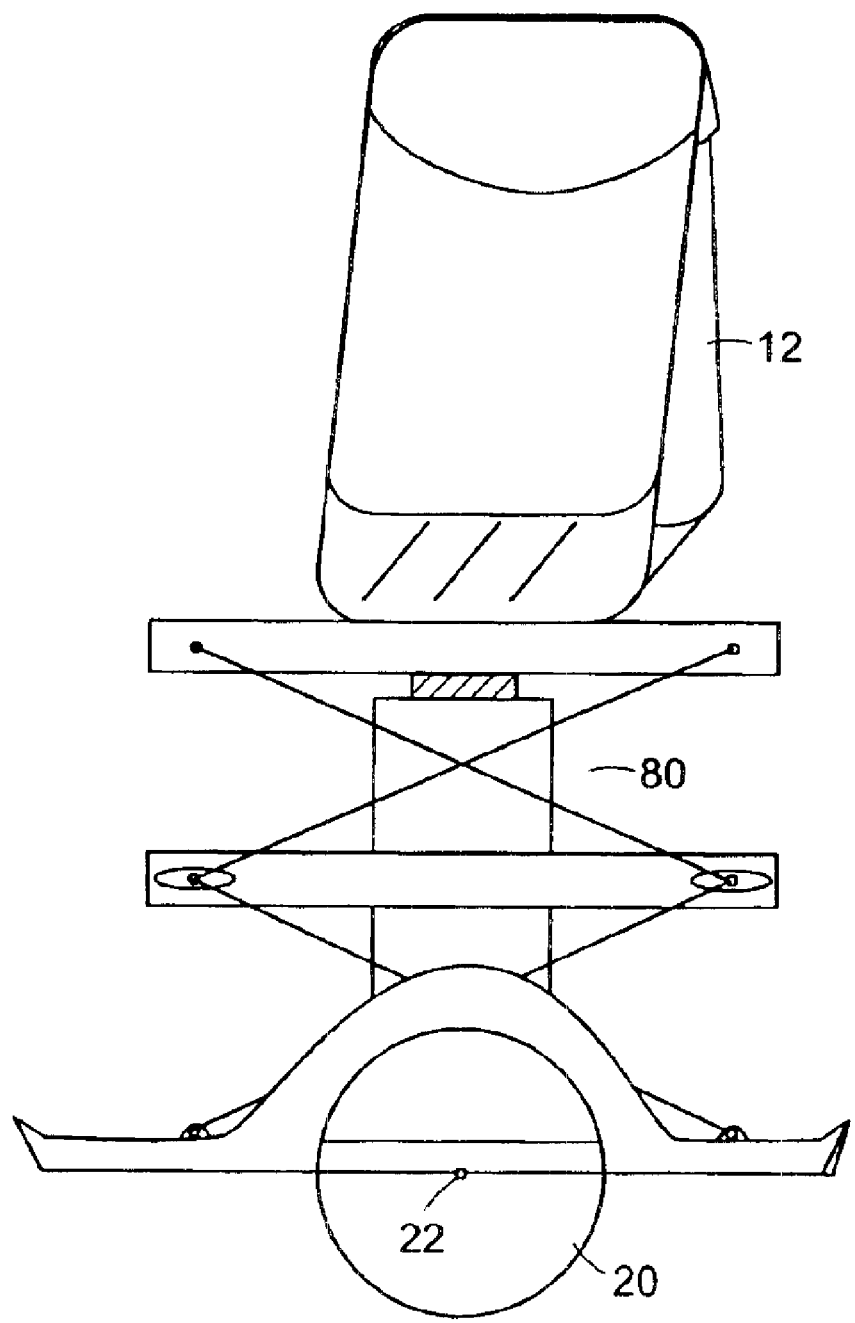
FIG. 8 is a side view of a balancing transporter employing a scissor mechanism for adjusting the elevation above the ground of a user, in accordance with another embodiment of the invention
Figure 9:
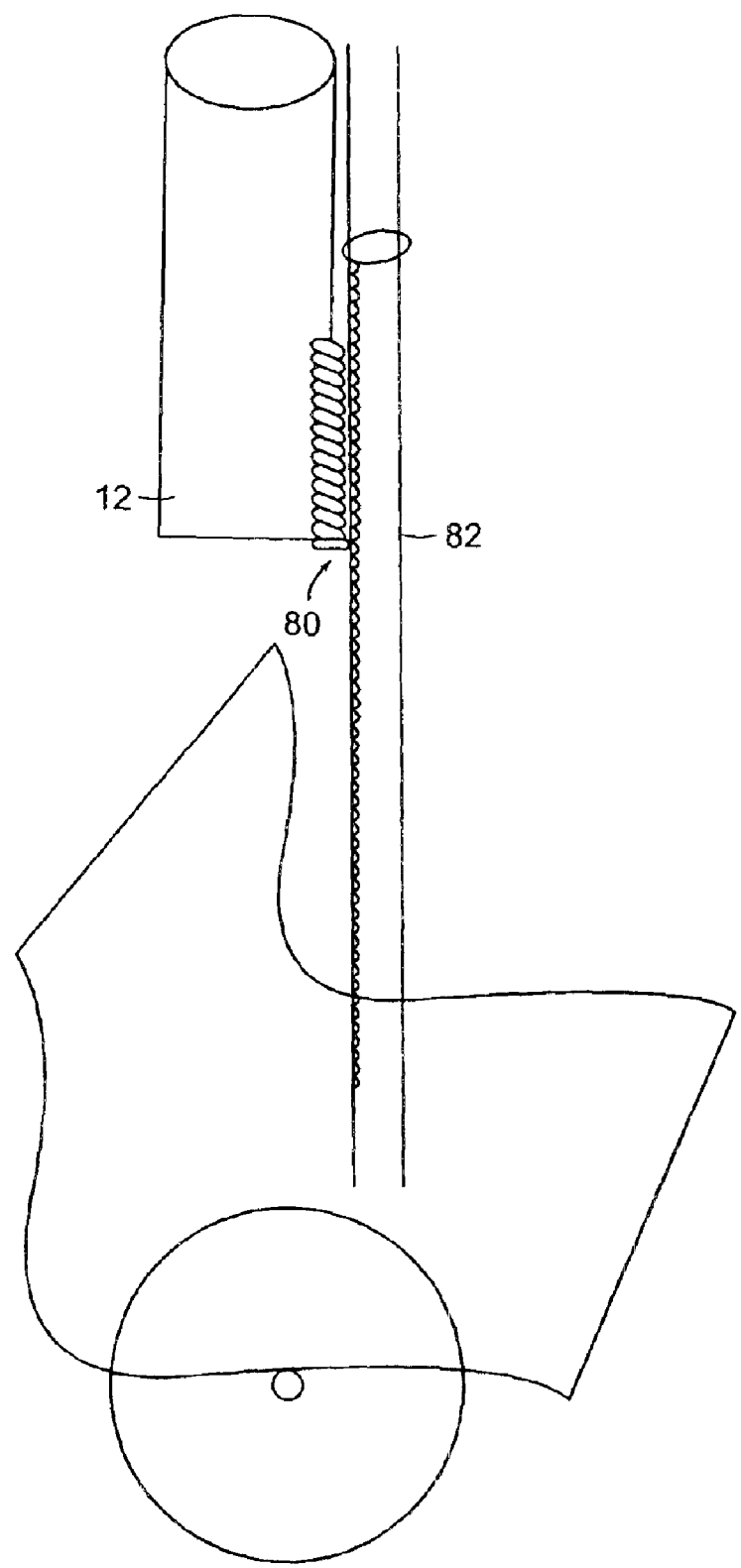
FIG. 9 is a perspective view of a balancing transporter employing a vertical lift for adjusting the elevation above the ground of a user, in accordance with yet another embodiment of the invention.

Alternate embodiments of the present invention are depicted in FIGS. 6–9. In FIG. 6, actuators 80, which may be hydraulic or pneumatic lifters, for example, are provided for varying the separation between support 12 and platform 16, thereby varying the elevation of a payload supported by support 12. Operation of the device may be controlled by user input interface 14, located on the support. In the embodiment of FIG. 7, hydraulic or pneumatic actuators 36 lift support 12 in a vertical direction by actuating articulating arms 38, 40, and 42 about the mutual pivots. Alternatively, vertical position may be adjusted, as depicted in FIG. 8, using a hydraulic or pneumatic lifter 80 to lift support 12 in a vertical direction substantially above common axis 22 of wheels 20. In yet a further embodiment of the invention, shown in FIG. 9, vertical position may be adjusted using a ratchet drive or screw drive 80 to elevate support 12 with respect to a vertical mast 82.

Various of the foregoing embodiments may advantageously be used to support a camera in either a stationary position or in motion, thereby providing the functionality of a camera dolly.

It should be noted that although many of the embodiments described herein utilize separate motors individually controlled, a common motor may be used for a number of functions, and the separate control may be achieved by appropriate clutch or other power transmission arrangement, such as a differential drive. The term "motorized drive" as used in this description and the following claims means any device that produces torque or force regardless of means, and therefore includes any device that converts an energy source to mechanical power, including a motor that is electric, hydraulic, pneumatic, or thermodynamic (the later including an internal combustion or an external combustion engine) together with any appropriate arrangement for transmission of such mechanical power.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A device for carrying a payload, which may include a user, over a surface, the device comprising:
   a. a payload support which supports the payload at a height above the surface,
   b. a ground-contacting module, mounted to the platform, including a plurality of laterally disposed ground-contacting members and defining a fore-aft plane;
   c. a motorized drive arrangement, coupled to the ground-contacting module; the drive arrangement, ground-contacting module and payload constituting a system; the motorized drive arrangement causing, when powered, automatically balanced operation of the system in an operating position that is unstable with respect to tipping in at least a fore-aft plane when the motorized drive arrangement is not powered; and
   d. an elevation mechanism for permitting variation of the height of the payload above the surface.

2. A device in accordance with claim 1, wherein the ground-contacting module includes two laterally disposed wheels upon which the device is capable of locomoting exclusively.

3. A device in accordance with claim 2, wherein the payload support includes a ladder.

4. A device in accordance with claim 2, wherein the elevation mechanism includes a hydraulic cylinder and piston.

5. A device in accordance with claim 2, further including a counterweight for maintaining the center of gravity substantially above a point of contact with the surface.

6. A device in accordance with claim 2, further including a foot for stabilizing the device at a single location.

7. A method for conveying a person to conduct an activity at one specified location, at least, the method comprising:
   a. placing the person on an elevated support coupled to a dynamically balancing personal work platform, the platform coupled to a motorized drive; and
   b. operating the motorized drive, taking into account frictional and gravitational forces acting on the system, in order to adjust lean of the system in the fore-aft plane to control motion of the platform.

8. A method in accordance with claim 7, further including locking the motorized drive at a specified position in a mode in which dynamic balancing is disabled.

* * * * *